(12) United States Patent
Leech et al.

(10) Patent No.: US 11,586,219 B2
(45) Date of Patent: Feb. 21, 2023

(54) OPTICAL BEACON FOR AUTONOMOUS DEVICE AND AUTONOMOUS DEVICE CONFIGURED TO USE THE SAME

(71) Applicant: SharkNinja Operating, LLC, Needham, MA (US)

(72) Inventors: Adam Leech, Newton, MA (US); Adam Khaw, Needham, MA (US); Conor Richardson, Needham, MA (US)

(73) Assignee: SharkNinja Operating LLC, Needham, MA (US)

( * ) Notice: Subject to any disclaimer, the term of this patent is extended or adjusted under 35 U.S.C. 154(b) by 494 days.

(21) Appl. No.: 16/697,405

(22) Filed: Nov. 27, 2019

(65) Prior Publication Data

US 2020/0166949 A1    May 28, 2020

Related U.S. Application Data

(60) Provisional application No. 62/772,394, filed on Nov. 28, 2018.

(51) Int. Cl.
*G05D 1/02* (2020.01)
*A47L 9/00* (2006.01)
*G05D 1/00* (2006.01)

(52) U.S. Cl.
CPC ............ *G05D 1/0276* (2013.01); *A47L 9/009* (2013.01); *G05D 1/0022* (2013.01);
(Continued)

(58) Field of Classification Search
CPC ......... A47L 2201/022; A47L 2201/024; A47L 2201/04; A47L 9/009; A47L 9/2852;
(Continued)

(56) References Cited

U.S. PATENT DOCUMENTS 5,313,262 A    5/1994  Leonard
5,999,296 A *  12/1999 Nishiura ............... G01S 1/7032
                                                  398/107
(Continued)

FOREIGN PATENT DOCUMENTS

EP    1921523      5/2008
JP    H06230135    8/1994
(Continued)

OTHER PUBLICATIONS

KR-20080050232-A—English Machine Translation (Year: 2008).*
(Continued)

*Primary Examiner* — Marc Carlson
(74) *Attorney, Agent, or Firm* — Grossman Tucker Perreault & Pfleger, PLLC

(57) ABSTRACT

An optical beacon may include a housing, an optical emitter at least partially disposed within the housing, and an optical identifier generator optically coupled to the optical emitter. Light incident on the optical identifier generator may be shaped into at least one optical identifier. The optical identifier may be associated with an action capable of being carried out by a robotic cleaner such that detection of the optical identifier by the robotic cleaner causes the robotic cleaner to carry out the action.

17 Claims, 8 Drawing Sheets

(52) U.S. Cl.
CPC ........ *G05D 1/0259* (2013.01); *A47L 2201/04* (2013.01); *G05D 2201/0215* (2013.01)

(58) Field of Classification Search
CPC .... A47L 9/2873; A47L 9/2884; A47L 9/2894; G05D 1/0022; G05D 1/0234; G05D 1/0259; G05D 1/0276; G05D 2201/0203; G05D 2201/0215
See application file for complete search history.

(56) References Cited

U.S. PATENT DOCUMENTS

| | | | |
|---|---|---|---|
| 9,582,005 B2* | 2/2017 | Jones | G05D 1/0234 |
| 9,939,529 B2* | 4/2018 | Haegermarck | B25J 9/1697 |
| 10,209,080 B2* | 2/2019 | Lindhé | G01C 21/206 |
| 2006/0087273 A1 | 4/2006 | Ko et al. | |
| 2012/0259465 A1* | 10/2012 | Chen | A47L 9/2805 901/1 |
| 2013/0204463 A1* | 8/2013 | Chiappetta | A47L 9/2826 701/2 |
| 2013/0214727 A1 | 8/2013 | Teng et al. | |
| 2013/0218342 A1 | 8/2013 | Teng et al. | |
| 2014/0100693 A1* | 4/2014 | Fong | B25J 13/006 700/253 |
| 2015/0115876 A1 | 4/2015 | Noh et al. | |
| 2016/0109884 A1* | 4/2016 | Chiappetta | G06F 17/00 701/23 |
| 2017/0066132 A1* | 3/2017 | Casey | G05D 1/0255 |
| 2017/0123433 A1* | 5/2017 | Chiappetta | H02J 50/10 |
| 2017/0220043 A1* | 8/2017 | Chiappetta | G01S 5/0284 |
| 2018/0236663 A1* | 8/2018 | Cohen | G01S 1/7038 |
| 2020/0166949 A1* | 5/2020 | Leech | A47L 9/2873 |

FOREIGN PATENT DOCUMENTS

| | | | |
|---|---|---|---|
| JP | H10995 | 1/1998 | |
| JP | 2003228421 | 8/2003 | |
| JP | 2006127448 | 5/2006 | |
| JP | 2007149115 | 6/2007 | |
| JP | 2013168150 | 8/2013 | |
| JP | 2015534048 | 11/2015 | |
| JP | 2015535373 | 12/2015 | |
| JP | 2016033746 | 3/2016 | |
| KR | 20080050232 A * | 6/2008 | |
| WO | WO-2013182941 A1 * | 12/2013 | G05D 1/0225 |
| WO | 2018091640 A2 | 5/2018 | |
| WO | 2020019951 A1 | 1/2020 | |

OTHER PUBLICATIONS

PCT Search Report and Written Opinion dated Feb. 11, 2020, received in PCT Application No. PCT/US19/63518, 10 pgs.
European Extended Search Report dated Jun. 14, 2022, received in European Patent Application No. 19888766.3, 8 pages.
Canadian Examiner's Report dated Jul. 4, 2022, received in Canadian Patent Application No. 3,121,163, 4 pages.
Japanese Office Action with English machine translation dated Jul. 25, 2022, received in Japanese Patent Application No. 2021-530118, 14 pages.
Australian Office Action dated Feb. 23, 2022, received in Australian Patent Application No. 2019387227, 3 pages.

* cited by examiner

OPTICAL BEACON FOR AUTONOMOUS DEVICE AND AUTONOMOUS DEVICE CONFIGURED TO USE THE SAME

CROSS-REFERENCE TO RELATED APPLICATIONS

The present application claims the benefit of U.S. Provisional Application Ser. No. 62/772,394 filed on Nov. 28, 2018, entitled Optical Beacon for Autonomous Device, which is fully incorporated herein by reference.

TECHNICAL FIELD

The present disclosure is generally related to optical beacons for use with autonomous devices and more specifically related to optical beacons configured to generate an identifier for communicating information to robotic cleaners.

BACKGROUND INFORMATION

Robotic cleaners (e.g., robotic vacuum cleaners) are configured to autonomously clean a surface within an environment. For example, a user of a robotic vacuum cleaner may locate the robotic vacuum cleaner in the environment and instruct the robotic vacuum cleaner to commence a cleaning operation. While cleaning, the robotic vacuum cleaner collects debris and deposits it in a dust cup for later disposal by a user. The robotic vacuum cleaner may be configured to automatically dock with a docking station to recharge one or more batteries powering the robotic vacuum cleaner and/or to empty the dust cup.

One or more beacons may be positioned within the environment and configured to emit a signal. The robotic cleaner can be configured to detect the signal based on physical properties of the emitted signal (e.g., intensity or wavelength). In other words, the physical properties of the signal can be selected such that the signal is either detected or not detected by the robotic cleaner. In response to detecting the signal, the robotic cleaner can be caused to turn away from the signal. Detection or non-detection of a signal based on the intensity of the signal may limit the ability of the beacon to communicate information to the robotic cleaner.

BRIEF DESCRIPTION OF THE DRAWINGS

These and other features and advantages will be better understood by reading the following detailed description, taken together with the drawings, wherein.

DETAILED DESCRIPTION

The present disclosure is generally related to a beacon configured to generate an optical identifier to communicate information to a robotic cleaner (e.g., a robotic vacuum cleaner). The beacon includes a housing, an optical emitter disposed at least partially within the housing, and an optical identifier generator optically coupled to the optical emitter, the optical identifier generator being configured to shape light emitted by the optical emitter into an optical identifier. The robotic cleaner being configured such that detection of the optical identifier causes the robotic cleaner to carry out one or more actions (e.g., avoiding of an area, carrying out specific cleaning operations within an area, loading of a map corresponding to an area, and/or the like).

Use of an optical identifier may allow information to be communicated to a robotic cleaner in a more robust manner (when compared to relying only on physical properties of a generated signal). For example, when an optical identifier is used, a shape and/or configuration of the optical identifier may be used to communicate information to the robotic cleaner. In some instances, in addition to the shape and/or configuration of the optical identifier, physical properties of the light (e.g., a wavelength and/or intensity) used to generate the optical identifier may also be used to communicate with the robotic cleaner. By contrast, when an optical identifier is not used (e.g., only a light beam is used), communication of information to the robotic cleaner may only be based on the physical properties of the generated signal (e.g., the intensity or wavelength of light used).

Optical identifier, as used herein, may generally refer to a light projection having one or more unique segments. A robotic cleaner may be configured to identify an action associated with the optical identifier based, at least in part, on at least a portion of the unique segment. In some instances, the optical identifier may comprise a plurality of repeating unique segments, defining a pattern. As such, the optical identifier may generally be described as having a shape and/or configuration that is capable of conveying information to a robotic device (e.g., a robotic cleaner) when detected by the robotic device.

Figure 1:
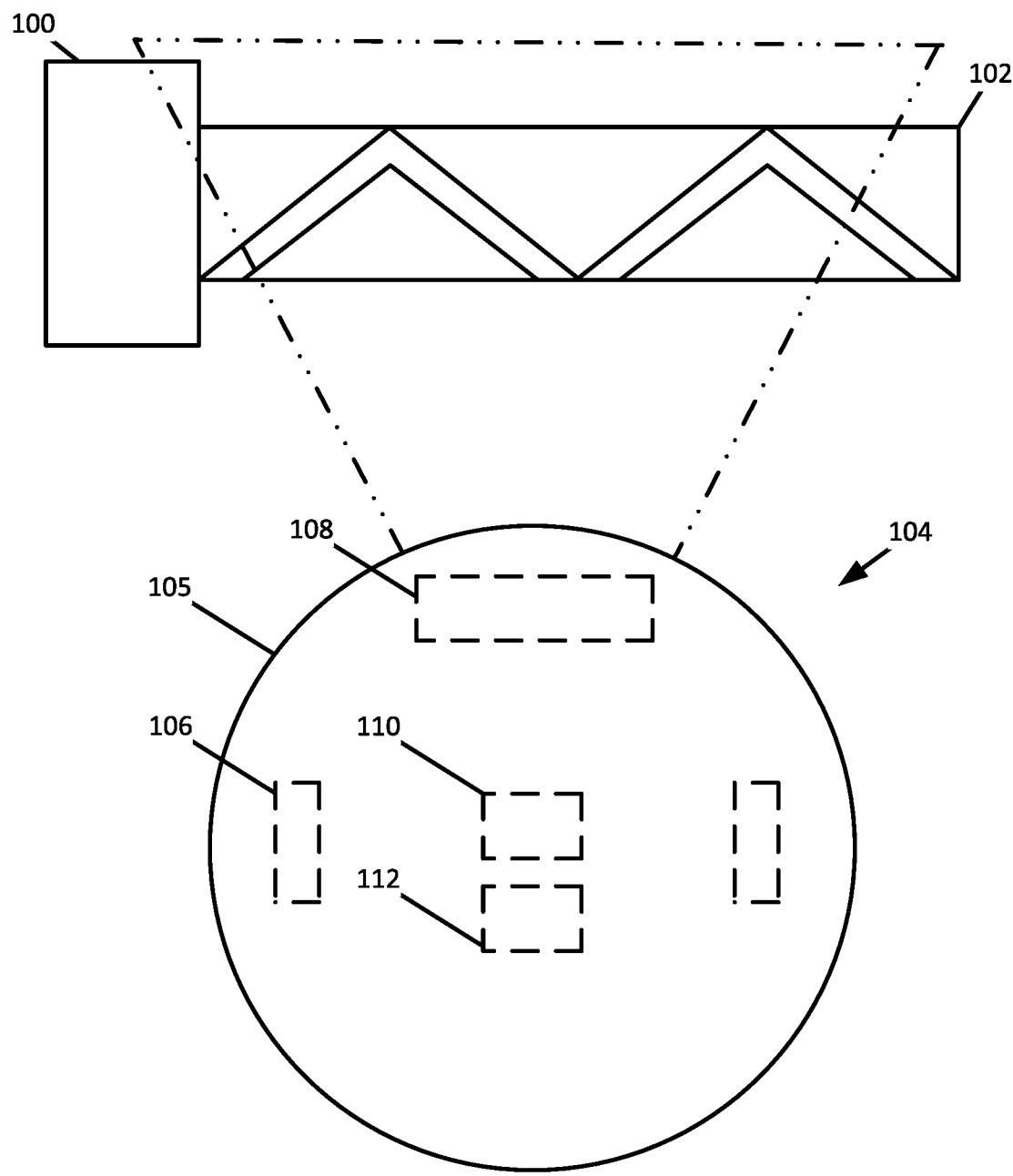
FIG. 1 is a schematic example of an optical beacon generating an optical identifier and a robotic cleaner configured to detect the optical identifier, consistent with embodiments of the present disclosure.

FIG. 1 shows a schematic view of an optical beacon 100 emitting light (e.g., infrared light) that defines at least one optical identifier 102. At least a portion of the optical identifier 102 is shown as extending transverse to a direction of movement of a robotic cleaner 104 when the robotic cleaner 104 is moving generally towards the optical beacon 100. The optical identifier 102 can be associated with an action of the robotic cleaner 104 such that, upon detecting at least a portion of the optical identifier 102, the robotic cleaner 104 is caused to carry out the associated action. In other words, the optical identifier 102 is associated with an action capable of being carried out by the robotic cleaner 104 such that detection of the optical identifier 102 causes the robotic cleaner 104 to carry out the action associated therewith.

The robotic cleaner 104 includes a body 105, one or more driven wheels 106 (shown in hidden lines) configured to urge the body 105 across a surface to be cleaned (e.g., a floor), at least one camera 108 (shown in hidden lines) (e.g., a monocular or stereo camera oriented in a forward, upward, or downward direction) coupled to the body 105 and configured such that at least a portion of the optical identifier 102 can be detected using the camera 108, and at least one processor 110 (shown in hidden lines) coupled to at least one memory 112 (shown in hidden lines), the processor 110 being configured to execute one or more instructions stored in the memory 112, the one or more instructions causing the robotic cleaner 104 to carry out one or more actions. For example, when the optical identifier 102 is detected using the camera 108, the processor 110 can cause the robotic cleaner 104 to carry out an action associated with the detected optical identifier 102. The actions may include one or more of a navigation action (e.g., an action causing the robotic cleaner 104 to avoid or enter an area), a cleaning action (e.g., an action causing the robotic cleaner to change a cleaning behavior such as adjusting a suction force and/or brush roll speed), a mapping action (e.g., loading a map associated with the detected optical identifier 102 or the associating of a current map with the detected optical identifier 102), and/or any other action.

In some instances, the optical beacon 100 can include one or more batteries for powering the optical beacon 100 such that the optical beacon 100 can generate the light that defines the optical identifier. The one or more batteries may be rechargeable. Additionally, or alternatively, the optical beacon 100 can be configured to electrically couple to an electrical grid (e.g., via a power outlet in a household).

Figure 2:
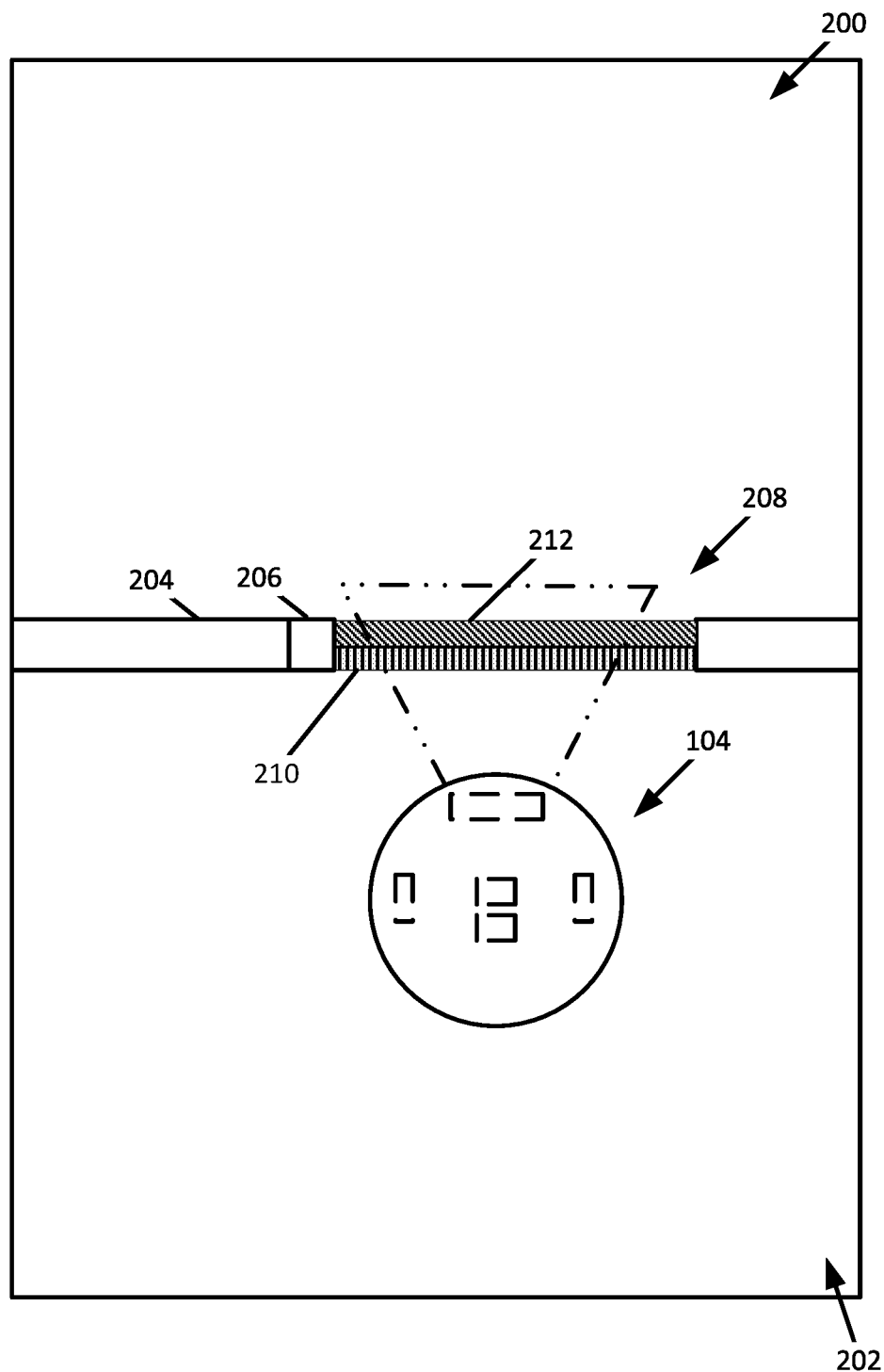
FIG. 2 is a schematic example of a plurality of rooms having an optical beacon generating an optical identifier that extends across an opening between the plurality of rooms, consistent with embodiments of the present disclosure.

FIG. 2 shows a schematic example of a floor plan having a first room 200 separated from a second room 202 by a wall 204. As shown, an optical beacon 206, which may be an example of the optical beacon 100 of FIG. 1, is disposed within an opening 208 (e.g., a doorway) in the wall 204. The optical beacon 206 is configured to generate at least a first optical identifier 210 and a second optical identifier 212. The first and second optical identifiers 210 and 212 may have a substantially linear configuration and extend in a direction away from the optical beacon 206. However, other configurations are possible (e.g., one or more of the first and second optical identifiers may extend at least partially around the optical beacon 206). Each of the optical identifiers 210 and 212 may have a corresponding action capable of being carried out by the robotic cleaner 104 associated therewith.

For example, the first optical identifier 210 may correspond to a navigation action (e.g., correspond to an action that causes the robotic cleaner 104 to pass through the opening 208) and the second optical identifier 212 may correspond to a cleaning action (e.g., correspond to a suction power or brush roll rotational speed) or a mapping action (e.g., loading of a map associated with the second optical identifier 212). In some instances, a plurality of actions may be associated with the second optical identifier 212, wherein at least one of the plurality of actions are further based, at least in part, on the order of detection of the first and second optical identifiers 210 and 212. For example, if the second optical identifier 212 is detected before the first optical identifier 210, the second optical identifier 212 may correspond to a navigation action (e.g., an action causing the robotic cleaner 104 to not pass through the opening 208). However, if the first optical identifier 210 is detected before the second optical identifier 212, the second optical identifier 212 may correspond to a cleaning action. In other words, the optical beacon 206 may be configured to function as a one directional gateway for the opening 208.

Additionally, or alternatively, a plurality of actions may be associated with one or more of the first or second optical identifiers 210 and 212, wherein at least one action is further associated with one or more predetermined criteria (e.g., a cleaning duration, a distance traveled, remaining battery power, and/or the like). For example, the first and/or second optical identifiers 210 and 212 may correspond to a navigation action (e.g., an action causing the robotic cleaner 104 to not pass through the opening 208) until a predetermined criteria is met (e.g., battery power remaining falls below a threshold, cleaning duration exceeds a threshold, distance traveled exceeds a threshold, and/or the like). In other words, the optical beacon 206 can be configured to prevent the robotic cleaner 104 from passing between the first and second rooms 200 and 202 until predetermined criteria are met.

Figure 3:
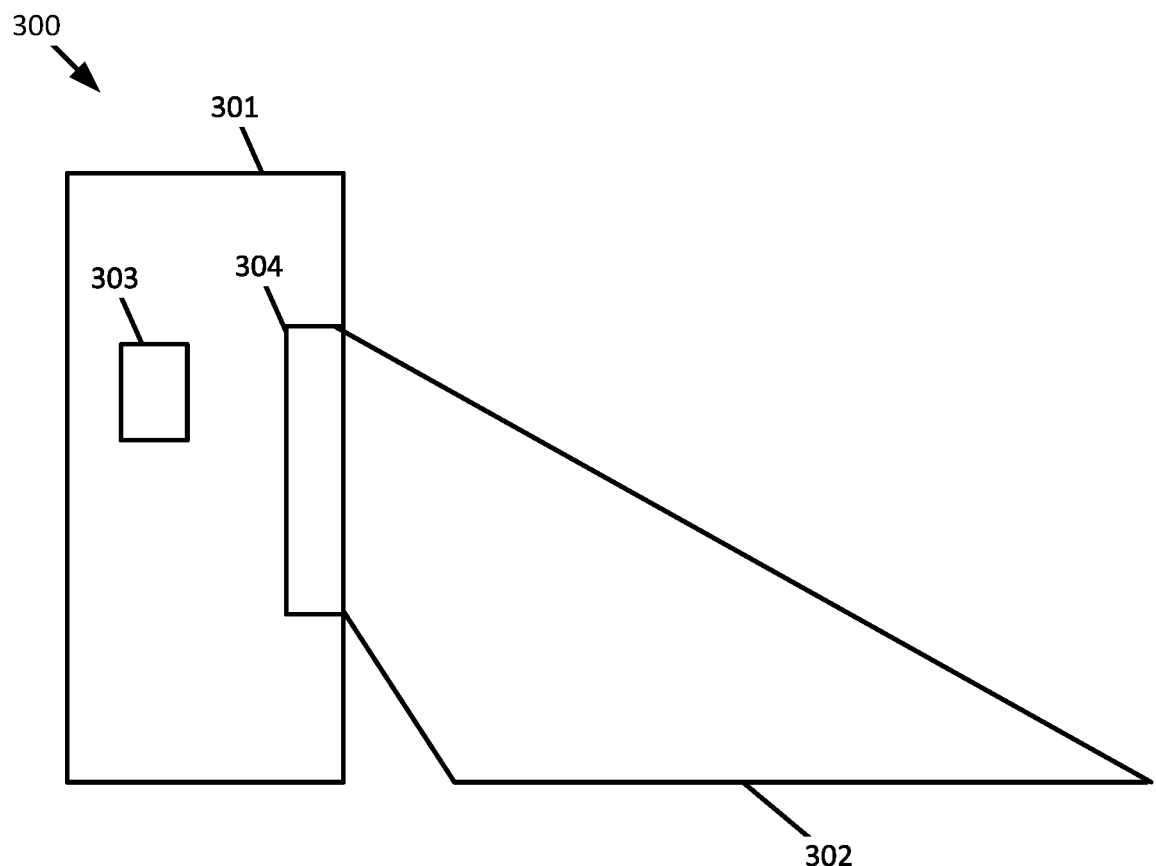
FIG. 3 is a schematic cross-sectional view of an optical beacon, which may be an example of the optical beacon of FIG. 1, consistent with embodiments of the present disclosure.

FIG. 3 shows a schematic cross-sectional view of an optical beacon 300, which may be an example of the optical beacon 100 of FIG. 1. The optical beacon 300 may be configured to generate one or more linear optical identifiers 302 (e.g., the first and/or second optical identifiers 210 and 212 of FIG. 2). As shown, the optical beacon 300 includes an optical emitter 303 (e.g., a light emitting diode) at least partially disposed within a housing 301 of the optical beacon 300 and configured to emit light (e.g., infrared light) into an optical identifier generator 304. As such, the optical emitter 303 may generally be described as being optically coupled to the optical identifier generator 304. The optical identifier generator 304 is configured such that light incident on the optical identifier generator 304 is shaped to form the linear optical identifier 302.

For example, the optical identifier generator 304 can be configured to shape the light passing therethrough such that the light linearly extends across a surface (e.g., a floor, wall, ceiling, and/or any other surface). In these instances, the optical identifier generator 304 includes a material having one or more opaque portions (non-light transmissive portions) and one or more light transmissive portions such that the light passing therethrough is shaped to define the optical identifier 302. For example, the shaped light may define a zig-zag shape, a curved shape, a spotted pattern, and/or any other shape/pattern.

The optical identifier generator 304 may include a film having light transmissive and opaque portions such that light passes therethrough according to an identifier defined by the film. Additionally, or alternatively, the optical identifier generator 304 may include a light guide having a plurality of light emission portions configured to cooperate to project the optical identifier 302. Additionally, or alternatively, the optical identifier generator 304 may include a diffractive optical element. Additionally, or alternatively, the optical identifier generator 304 may include a prism.

Figure 4:
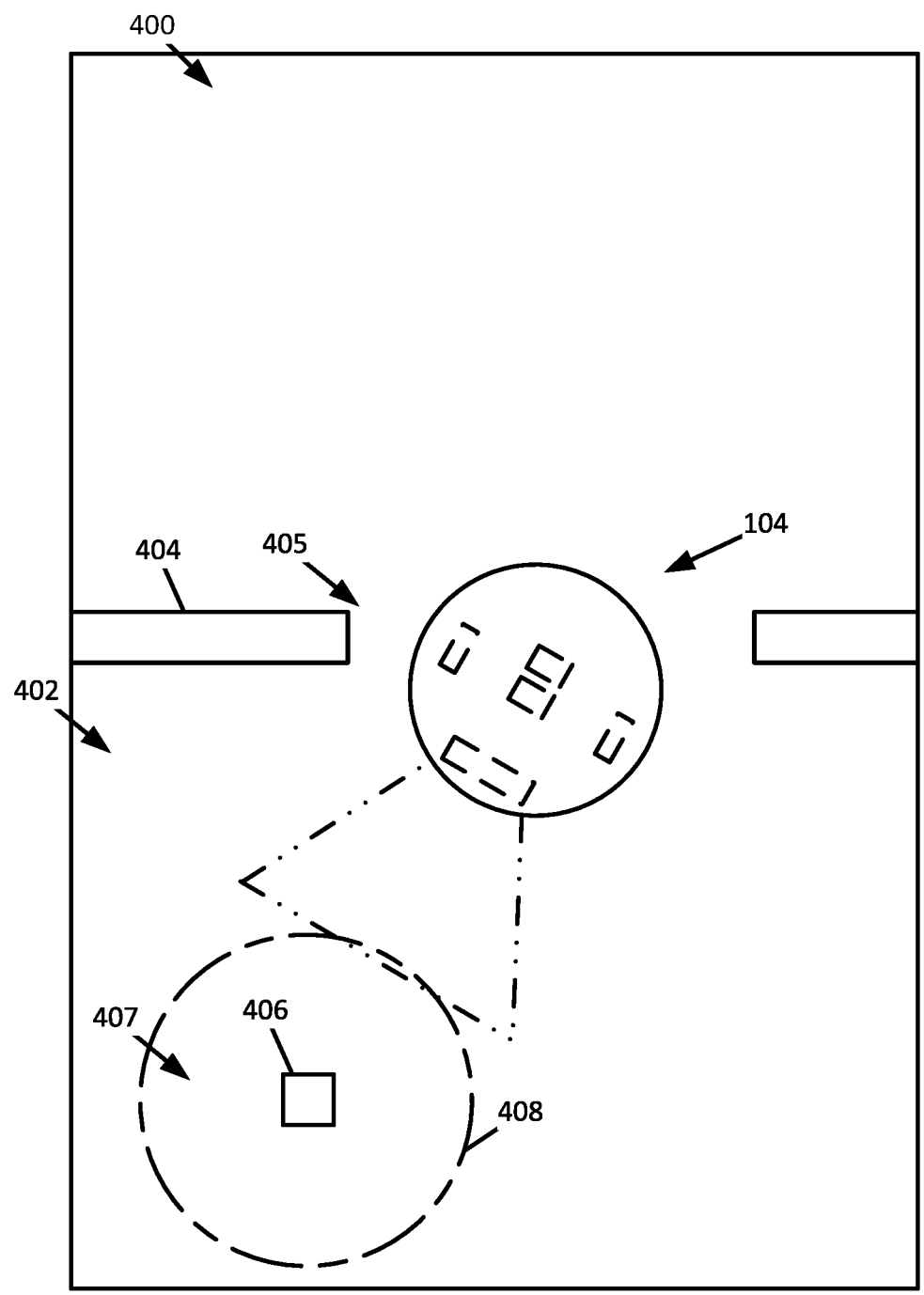
FIG. 4 is a schematic example of a plurality of rooms having an optical beacon generating an optical identifier that defines a bounded area, consistent with embodiments of the present disclosure.

FIG. 4 shows a schematic example of a floor plan having a first room 400 separated from a second room 402 by a wall 404 having an opening 405 (e.g., a doorway). As shown, an optical beacon 406, which may be an example of the optical beacon 100 of FIG. 1, is disposed within the second room 402. The optical beacon 406 is configured to generate at least one optical identifier 408 that extends around the optical beacon 406, defining a bounded area 407. For example, the optical identifier 408 may have an annular shape, a square shape, a rectangular shape, a pentagonal shape, a triangular shape, an octagonal shape, and/or any other shape.

Upon detecting the optical identifier 408, the robotic cleaner 104 may be caused to carry out one or more actions (e.g., a navigation action, a cleaning action, a mapping action, and/or any other action) associated with the optical identifier 408. For example, the optical beacon 406 may be disposed in a portion of the second room 402 such that the bounded area 407 defines an area in which the robotic cleaner 104 is not to travel. By way of further example, the optical beacon may be disposed in a portion of the second room 402 such that the bounded area 407 defines an area in which the robotic cleaner 104 is caused to perform enhanced cleaning (e.g., increases the suction power and/or brush roll speed).

In some instances, the optical beacon 406 may be configured to generate a plurality of optical identifiers 408. As discussed in relation to FIG. 2, the action caused to be carried out by the robotic cleaner 104 may be based, at least in part, on the order in which the robotic cleaner 104 detects each of the optical identifiers 408.

Figure 5:
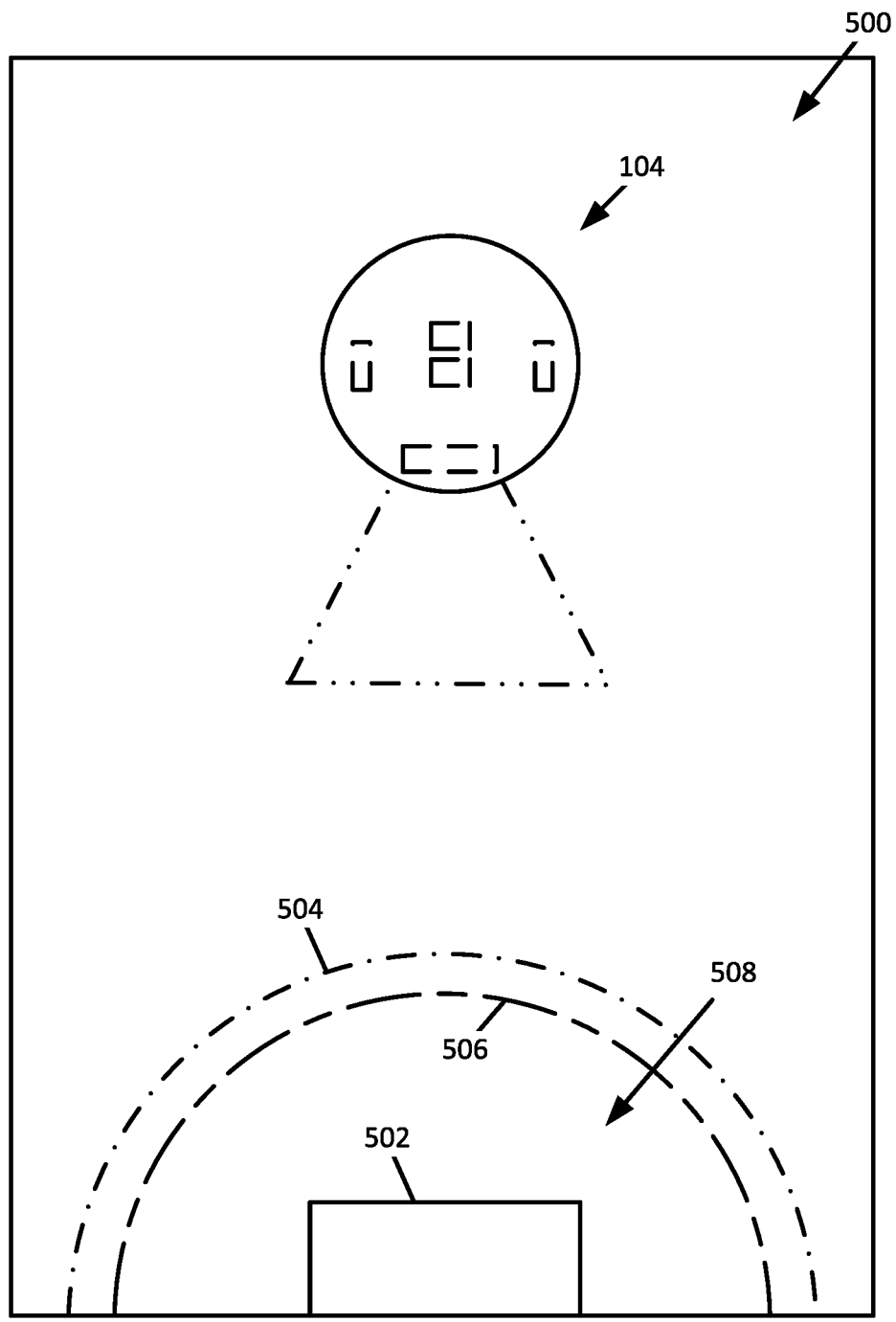
FIG. 5 is a schematic example of a room having a docking station disposed therein, wherein the docking station may be an example of the optical beacon of FIG. 4, consistent with embodiments of the present disclosure.

FIG. 5 shows a schematic floor plan of a room 500 having a docking station 502 disposed therein, the docking station 502 may be an example of the optical beacon 406 of FIG. 4. The docking station 502 can be configured to electrically couple to the robotic cleaner 104 such that one or more batteries of the robotic cleaner 104 can be recharged. In some instances, the docking station 502 can be configured to remove debris from a dust cup of the robotic cleaner 104.

As shown, the docking station 502 can be configured to generate at least a first optical identifier 504 and a second optical identifier 506. The first optical identifier 504 can correspond to a first action (e.g., a navigation action, a cleaning action, a mapping action, and/or any other action) and the second optical identifier 506 can correspond to a second action (e.g., a navigation action, a cleaning action, a mapping action, and/or any other action). In some instances, the action associated with the first and second optical identifiers 504 and 506 may be based, at least in part, on the order in which the first and second optical identifiers 504 and 506 are detected. For example, the first optical identifier 504 can correspond to a navigation action that causes the robotic cleaner 104 to enter a bounded area 508 defined by the first and second optical identifiers 504 and 506. When the first optical identifier 504 is detected before the second optical identifier 506, the second optical identifier 506 may indicate, for example, a docking station type (e.g., whether or not the docking station is capable of removing debris from a dust cup of the robotic cleaner). However, when the second optical identifier 506 is detected before the first optical identifier 504, the second optical identifier 506 may correspond to a navigation action (e.g., an action preventing the robotic cleaner 104 from exiting the bounded area 508). As such, the robotic cleaner 104 may be kept proximate to the docking station 502 such that the robotic cleaner 104 can engage the docking station 502.

Additionally, or alternatively, one or more of the first and second optical identifiers 504 and 506 can be associated with a plurality of actions. At least one of the actions may be further associated with one or more predetermined criteria (e.g., a cleaning duration, a distance traveled, remaining battery power, and/or the like). For example, the second optical identifier 506 may correspond to a navigation action that prevents the robotic cleaner 104 from exiting the bounded area 508 if a measure of battery power is below a threshold.

Figure 6:
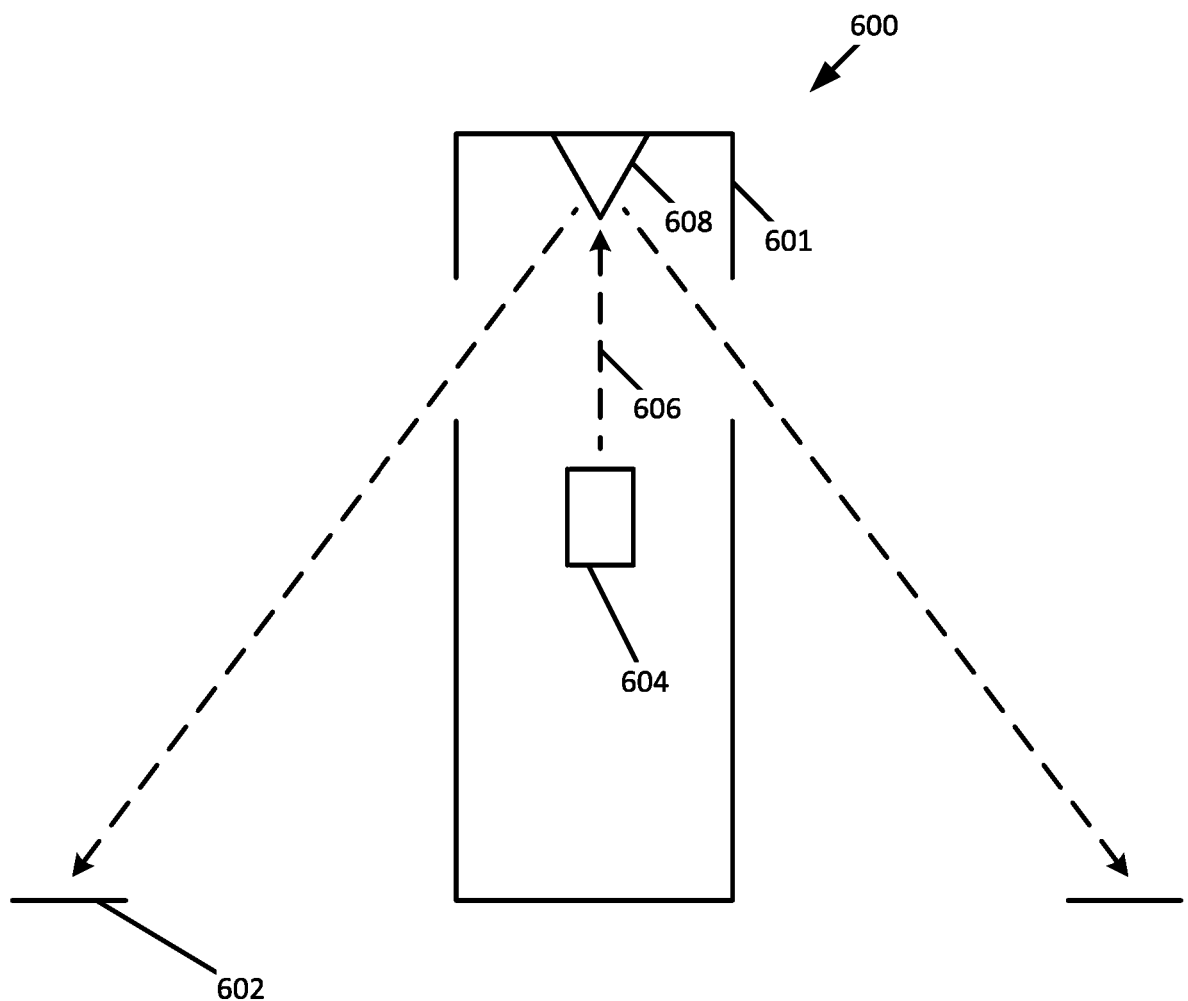
FIG. 6 is a schematic cross-sectional view of an optical beacon, which may be an example of the optical beacon of FIG. 1, consistent with embodiments of the present disclosure.

FIG. 6 shows a schematic cross-sectional view of an optical beacon 600, which may be an example of the optical beacon 100 of FIG. 1. The optical beacon 600 is configured to generate an optical identifier 602 that extends annularly around the optical beacon 600. As shown, the optical beacon 600 includes an optical emitter 604 (e.g., a light emitting diode) at least partially disposed within a housing 601 of the optical beacon 600 and configured to emit light (e.g., infrared light) along a light path 606. The light path 606 extends from the optical emitter 604 and is incident on an optical identifier generator 608. The light path 606 extends from the optical identifier generator 608 and into an environment surrounding the optical beacon 600.

The optical identifier generator 608 can be configured such that light incident on the optical identifier generator 608 is shaped to have an identifier that is projected into the surrounding environment (e.g., a floor, wall, ceiling, and/or any other surface). For example, the optical identifier generator 608 may include a prism, a conical mirror (e.g., having one or more non-reflective portions defining a shape of the optical identifier to be generated), a diffractive optical element, and/or any other optical element capable of generating an identifier. In some instances, the optical identifier generator 608 may include a conical mirror configured to direct light into one or more prisms, one or more films having opaque and transmissive portions defining the identifier, one or more diffractive optical elements, and/or any other optical element capable of generating an identifier.

Figure 7:
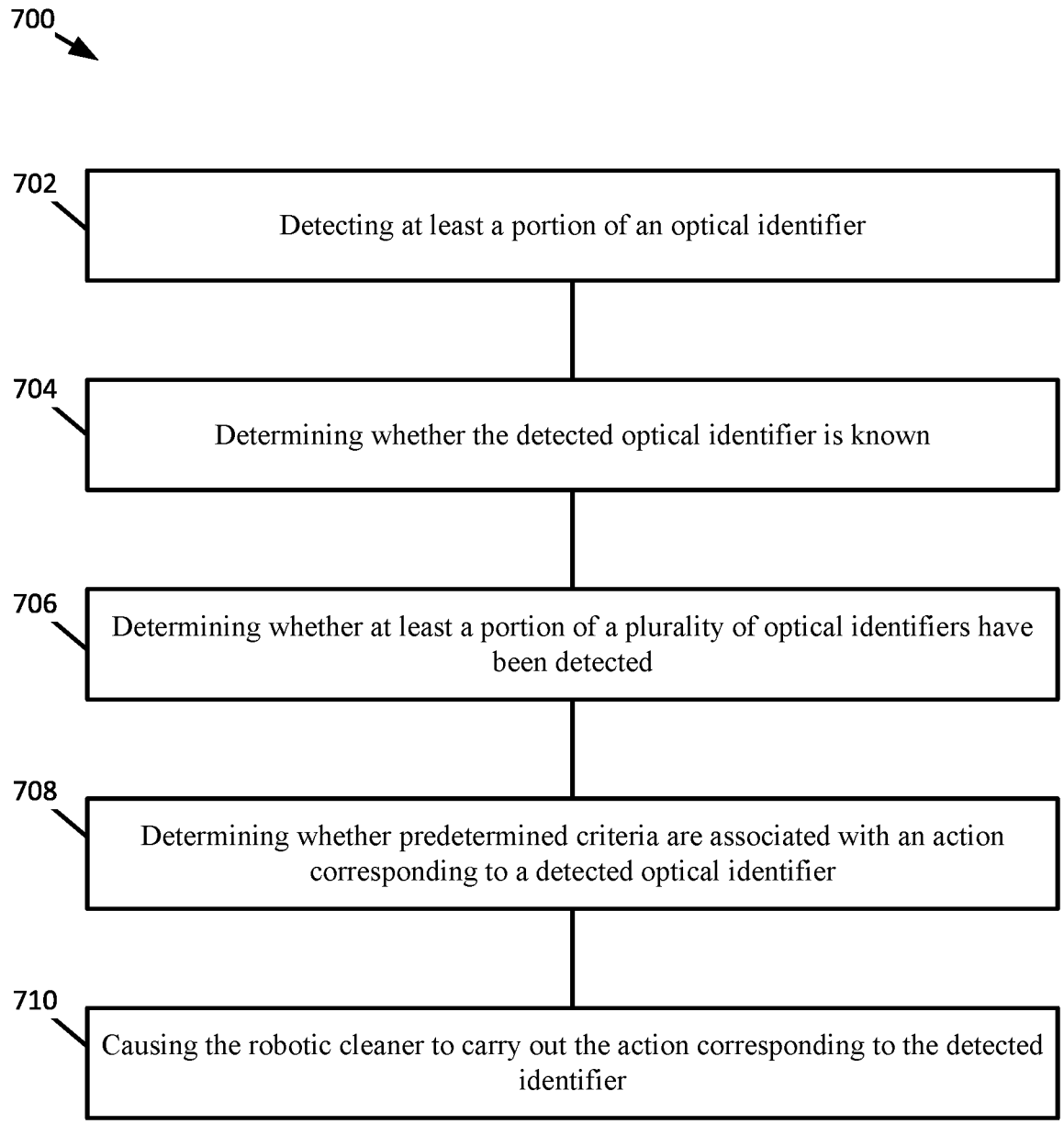
FIG. 7 is a flow chart of an example of a method for carrying out an action using a robotic cleaner, such as the robotic cleaner of FIG. 1, in response to detecting at least a portion of an optical identifier, such as the optical identifier of FIG. 1, consistent with embodiments of the present disclosure.

FIG. 7 shows a flow chart of an example method 700 of carrying out an action using a robotic cleaner, such as the robotic cleaner 104 of FIG. 1, in response to detecting at least a portion of an optical identifier, such as the optical identifier 102 of FIG. 1. The method 700 may include a step 702. The step 702 may include detecting, using a camera of the robotic cleaner, at least a portion of an optical identifier projected onto a surface (e.g., a floor, wall, ceiling, and/or any other surface) by an optical beacon. For example, the optical identifier may be projected onto a surface to be cleaned.

The method 700 may also include a step 704. The step 704 may include determining whether the detected optical identifier is known based, at least in part, on a comparison of at least a portion of the detected identifier to one or more known identifiers stored in a memory of the robotic cleaner. In response to the comparison indicating that the detected identifier corresponds to a known identifier, determining at least one action (e.g., a cleaning action, a navigation action, a mapping action, and/or any other action) associated with the detected identifier. In some instances, the detected identifier may be determined to have a plurality of actions associated therewith. In response to the comparison indicating that the detected identifier does not correspond to a known identifier (i.e., the detected identifier is unknown), the robotic cleaner may be configured to associate the detected identifier with at least one action (e.g., a cleaning action, a navigation action, a mapping action, and/or any other action). For example, the robotic cleaner may be configured to query a user to determine which action to associate with the detected identifier.

The method 700 may also include a step 706. The step 706 may include determining whether at least a portion of a plurality of optical identifiers are detected within a predetermined time period (e.g., 0.5 seconds, 1 second, 2, seconds, and/or any other predetermined time period). For example, when a plurality of optical identifiers are detected (each being known and having at least one action associated therewith), the robotic cleaner can be configured to determine whether one or more of the actions associated with one or more of the plurality of optical identifiers are also associated with an order in which the first and second optical identifiers are detected. If the actions are determined to also be associated with an order of detection, the order in which the optical identifiers are detected can be determined and the robotic cleaner can be configured to carry out an action associated with the order of detection and corresponding optical identifier. In other words, the robotic cleaner can be caused to carry out one or more actions associated with the detected identifiers based, at least in part, on an order of detection. If the actions are not determined to be associated with an order of detection, the robotic cleaner can be configured to carry out each action associated with the respective optical identifiers and/or associate an action with one or more of the detected identifiers that is based, at least in part, on the order of detection (e.g., in response to querying a user of the robotic cleaner).

The method 700 may also include a step 708. The step 708 may include determining whether predetermined criteria (e.g., a cleaning duration, a distance traveled, remaining battery power, and/or the like) are associated with an action corresponding to the detected optical identifier. If predetermined criteria are associated with the action, the robotic cleaner can be configured to carry out the action only if the predetermined criteria are met.

The method 700 may also include a step 710. The step 710 can include causing the robotic cleaner to carry out the one or more actions associated with the one or more optical identifiers.

The method 700 can be embodied as instructions in at least one non-transitory computer readable medium such that, when the instructions are executed by one or more processors, the method 700 can be caused to be carried out. In some instances, one or more steps of the method 700 can be embodied in circuitry (e.g., an application specific integrated circuit). As such, the method 700 can be carried out using any combination of software, firmware, and/or hardware.

Figure 8:
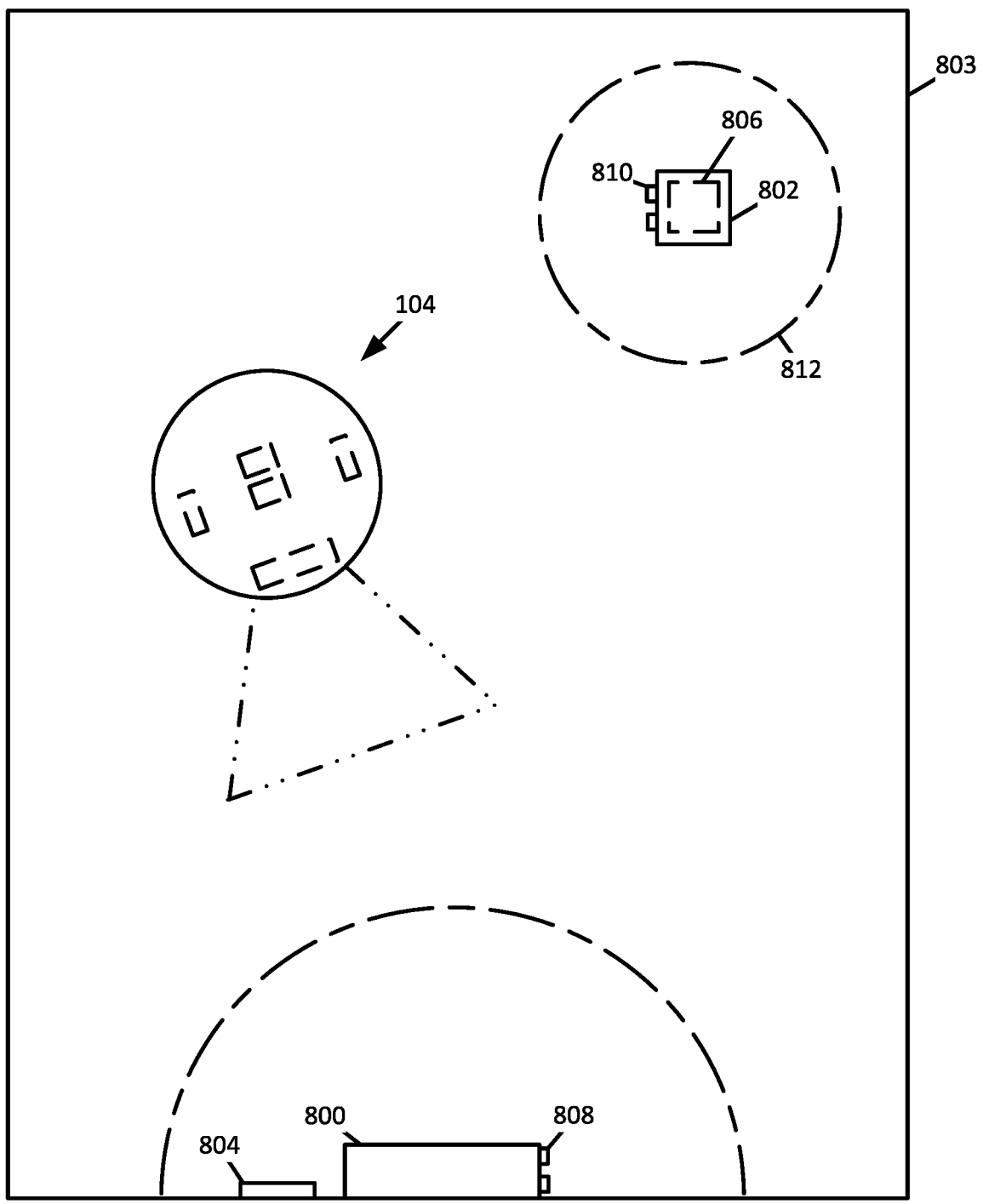
FIG. 8 is a schematic example of a room having a main optical beacon and a satellite optical beacon disposed therein, consistent with embodiments of the present disclosure.

FIG. 8 shows a schematic example of a main beacon 800 and a satellite beacon 802 disposed within a room 803. The main beacon 800 and the satellite beacon 802 may be examples of the optical beacon 100 of FIG. 1. The main beacon 800 can be configured to be electrically coupled to an electrical grid via a power outlet 804. In some instances, the main beacon 800 can be a docking station configured to recharge one or more rechargeable batteries of the robotic cleaner 104. The satellite beacon 802 can be configured to be powered by one or more rechargeable batteries 806 (shown in hidden lines).

The main beacon 800 can be configured to charge the one or more rechargeable batteries 806 of the satellite beacon 802. For example, the main beacon 800 can include a plurality of main charging contacts 808 configured to electrically couple to a plurality of satellite charging contacts 810 disposed on the satellite beacon 802. Additionally, or alternatively, the one or more rechargeable batteries 806 can be recharged by electrically coupling the satellite beacon 802 to the power outlet 804 via a power cable.

In some instances, the robotic cleaner 104 can be configured to recharge the satellite beacon 802. For example, if, when performing a cleaning operation, the robotic cleaner 104 detects that an intensity of the light defining a satellite optical identifier 812 has fallen below a threshold, the robotic cleaner 104 can electrically couple to the satellite beacon 802 to recharge the one or more rechargeable batteries 806 of the satellite beacon 802 (e.g., after completion of the cleaning operation) using one or more rechargeable batteries of the robotic cleaner 104. As such, the one or more rechargeable batteries 806 may be recharged without involving a user of the robotic cleaner 104.

An example of an optical beacon, consistent with the present disclosure, may include a housing, an optical emitter at least partially disposed within the housing, and an optical identifier generator optically coupled to the optical emitter. Light incident on the optical identifier generator may be shaped into at least one optical identifier. The optical identifier may be associated with an action capable of being carried out by a robotic cleaner such that detection of the optical identifier by the robotic cleaner causes the robotic cleaner to carry out the action.

In some instances, the optical identifier generator may include a diffractive optical element. In some instances, the optical identifier generator may include a prism. In some instances, the at least one optical identifier may include a plurality of optical identifiers, each optical identifier having a corresponding action associated therewith. In some instances, the optical identifier may be substantially linear. In some instances, the optical identifier may extend around the housing, defining a bounded area. In some instances, the optical identifier may extend annularly around the housing. In some instances, the action may be one or more of a cleaning action or a navigation action. In some instances, the optical beacon may further include one or more rechargeable batteries. In some instances, the one or more rechargeable batteries may be recharged using a docking station for the robotic cleaner, the docking station being electrically coupled to an electrical grid via a power outlet. In some instances, the one or more rechargeable batteries may be recharged using the robotic cleaner.

An example of a robotic cleaner, consistent with the present disclosure, may include a body, one or more driven wheels configured to urge the body across a surface to be cleaned, a camera coupled to the body, and at least one processor configured execute one or more instructions stored in at least one memory. Upon executing the one or more instructions the processor may cause the robotic cleaner to carry out operations including detecting at least one optical identifier projected onto the surface to be cleaned by an optical beacon, determining whether the detected optical identifier is known based, at least in part, on a comparison of at least a portion of the detected optical identifier to one or more known optical identifiers stored in the memory, in response to determining that the detected optical identifier is known, determining at least one action associated with the detected optical identifier, and causing the robotic cleaner to carry out the determined action.

In some instances, the operations may further include, in response to determining that the optical identifier is unknown, causing the robotic cleaner to associate at least one action with the detected optical identifier. In some instances, a plurality of optical identifiers may be detected, each of the optical identifiers being known and having at least one respective action associated therewith. In some instances, at least one of the plurality of optical identifiers may have a plurality of actions associated therewith. In some instances, the operations may further include determining an order of detection for the plurality of optical identifiers. In some instances, the robotic cleaner may be caused to carry out one or more of the plurality of actions associated with at least one of the optical identifiers based, at least in part, on the order of detection. In some instances, the optical identifier may be substantially linear. In some instances, the optical identifier may extend around the optical beacon, defining a bounded area. In some instances, the optical identifier may extend annularly around the optical beacon.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical beacon comprising:
a housing;
an optical emitter at least partially disposed within the housing; and
an optical identifier generator optically coupled to the optical emitter, light incident on the optical identifier generator is shaped into a cleaning optical identifier and a map loading optical identifier, each optical identifier having a plurality of repeating unique segments that define a pattern, the cleaning optical identifier is associated with a cleaning action capable of being carried out by a robotic cleaner and the map loading optical identifier is associated with a map loading action capable of being carried out by the robotic cleaner, wherein detection of the cleaning and map loading optical identifiers by the robotic cleaner causes the robotic cleaner to carry out the cleaning and map loading actions.

2. The optical beacon of claim 1, wherein the optical identifier generator includes a diffractive optical element.

3. The optical beacon of claim 1, wherein the optical identifier generator includes a prism.

4. The optical beacon of claim 1, wherein each optical identifier is substantially linear.

5. The optical beacon of claim 1, wherein each optical identifier extends around the housing, defining a bounded area.

6. The optical beacon of claim 5, wherein each optical identifier extends annularly around the housing.

7. The optical beacon of claim 1 further comprising one or more rechargeable batteries.

8. The optical beacon of claim 7, wherein the one or more rechargeable batteries are recharged using a docking station for the robotic cleaner, the docking station being electrically coupled to an electrical grid via a power outlet.

9. The optical beacon of claim 7, wherein the one or more rechargeable batteries are recharged using the robotic cleaner.

10. A robotic cleaner comprising:
a body;
one or more driven wheels configured to urge the body across a surface to be cleaned;
a camera coupled to the body; and
at least one processor configured execute one or more instructions stored in at least one memory, upon executing the one or more instructions the processor causes the robotic cleaner to carry out operations comprising:
detecting at least one optical identifier projected onto the surface to be cleaned by an optical beacon;
determining whether the detected optical identifier is known based, at least in part, on a comparison of at least a portion of the detected optical identifier to one or more known optical identifiers stored in the memory;
in response to determining that the detected optical identifier is known:
determining at least one action associated with the detected optical identifier; and
causing the robotic cleaner to carry out the determined action; and
in response to determining that the detected optical identifier is unknown:
querying a user to identify an action to be associated with the detected optical identifier; and
associating the identified action with the detected optical identifier.

11. The robotic cleaner of claim 10, wherein a plurality of optical identifiers are detected, each of the optical identifiers being known and having at least one respective action associated therewith.

12. The robotic cleaner of claim 11, wherein at least one of the plurality of optical identifiers has a plurality of actions associated therewith.

13. The robotic cleaner of claim 12, wherein the operations further comprise determining an order of detection for the plurality of optical identifiers.

14. The robotic cleaner of claim 13, wherein the robotic cleaner is caused to carry out one or more of the plurality of actions associated with at least one of the optical identifiers based, at least in part, on the order of detection.

15. The robotic cleaner of claim 10, wherein the optical identifier is substantially linear.

16. The robotic cleaner of claim 10, wherein the optical identifier extends around the optical beacon, defining a bounded area.

17. The robotic cleaner of claim 16, wherein the optical identifier extends annularly around the optical beacon.

* * * * *